UNITED STATES PATENT OFFICE.

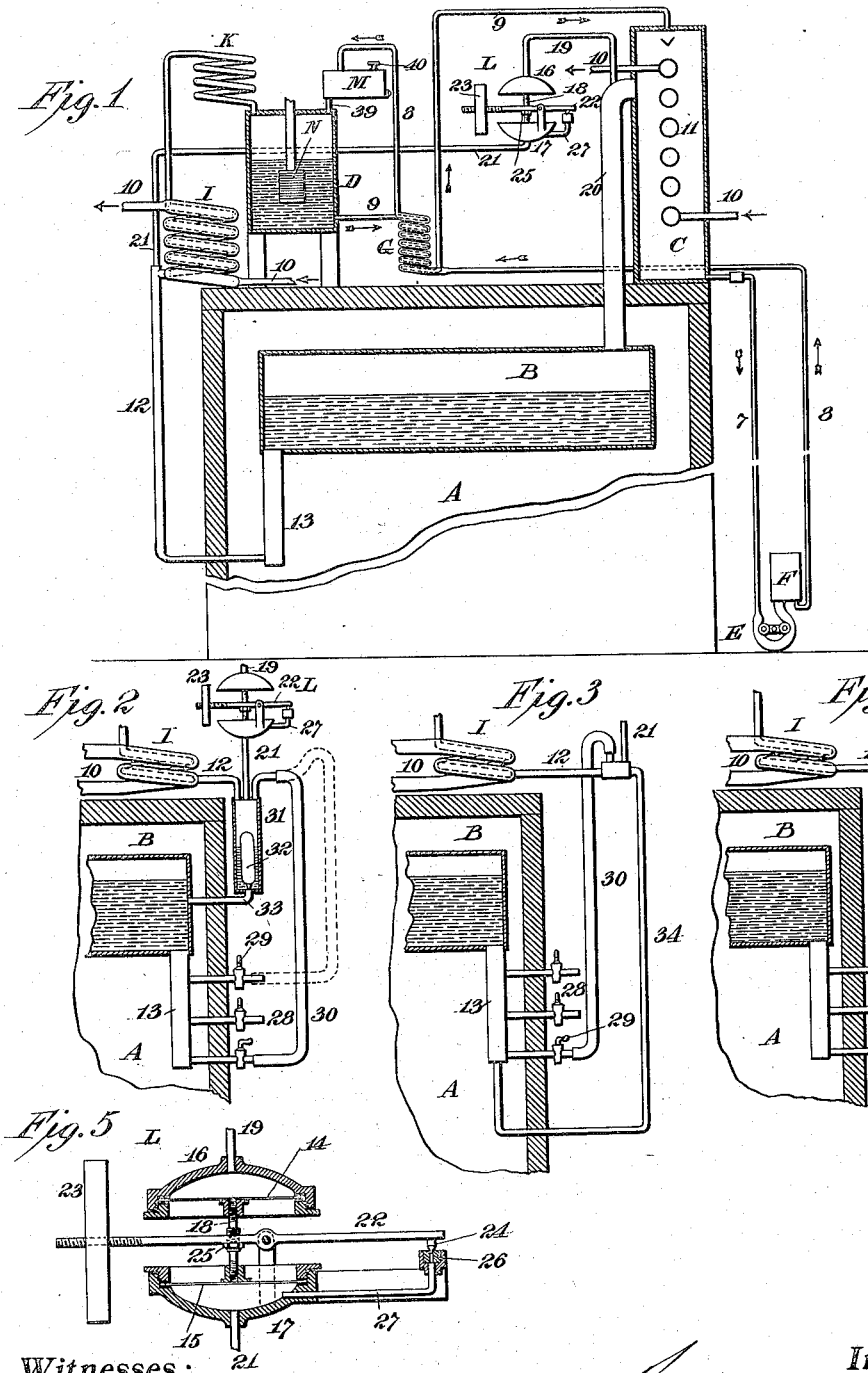

RICHARD N. DYER, OF EAST ORANGE, NEW JERSEY.

REFRIGERATING-MACHINE.

942,367.

Specification of Letters Patent.

Patented Dec. 7, 1909.

Application filed February 4, 1907. Serial No. 355,542.

*To all whom it may concern:*

Be it known that I, RICHARD N. DYER, a citizen of the United States, residing in East Orange, Essex county, New Jersey, have invented a certain new and useful Improvement in Refrigerating-Machines, of which the following is a description.

My invention relates to refrigerating machines, wherein a vacuum is maintained in a brine reservoir and the water vapor boiled from the brine is absorbed by an absorbent solution such as caustic potash, from which the water is distilled, condensed and returned to the brine.

The object of the invention is to make machines of this class more automatic, controllable, certain and efficient in action.

The invention consists in the various features and combinations of parts hereinafter described and pointed out in the claims.

In the drawing, Figure 1 is a vertical section and partial elevation showing the general structural elements of the machine; Figs. 2, 3 and 4 are views similar to Fig. 1 showing different forms of the connections between the condenser and the brine reservoir; and Fig. 5 is a sectional view showing the automatic valve for admitting air to the higher pressure part of the apparatus, i. e., the still and condenser.

A is the refrigerating chamber, B the brine reservoir, C the absorber and D the still, as usual in machines of this class.

E is the pump for withdrawing the potash solution and entrapped air bubbles from the absorber through the drop tube 7.

F is the air trap at which the air is separated from the potash solution and discharged from the apparatus. The potash solution is returned to the still through the pipe 8 forming the outer pipe of a double pipe heat exchanger G. The concentrated potash solution flows from the still through pipes 9 forming the inner pipe of the exchanger G and rising to the top of the absorber into which the solution is discharged, the difference in level maintaining the difference in pressure between the still and absorber.

I is the condenser whose inner pipe is connected through rectifying coil K with the still and receives the water vapor therefrom. The outer pipe of the condenser is connected with the water circulating pipe 10 as are also the cooling pipes 11 in the absorber. For simplicity of illustration the connections of the water circulation with the absorber pipes 11 and the condenser I are not carried out in the drawing. The direction of the water circulation is shown by arrows with barbs only while the circulation of the absorbent solution is shown by arrows with barbs and feathers. The water vapor from the still passing through the rectifying coil K enters the inner pipe of the condenser I, from which water of condensation is carried by a pipe 12 to the pipe 13 depending from the brine reservoir, so as to form a hydrostatic column, maintaining by means of the entrapped air in the pipe 12 the difference in pressure between the brine reservoir on the one hand and the still and condenser on the other hand.

The water vapor from the brine in the reservoir B passes into the absorber C, where it is absorbed by the potash solution flowing down over the cooling pipes 11 which carry off the heat. The potash solution is drawn off with entrapped air bubbles from the absorber C by the drop tube 7 and pump E, and the potash solution freed of air is returned to the still by the pipe 8, where it is concentrated by heat, the concentrated solution returning to the absorber through the pipe 9. The water vapor distilled from the potash solution in the still D is condensed in the condenser I and returned to the brine through the pipes 12, 13.

It has been found that in machines of this class it may be desirable under certain circumstances to admit air to the higher pressure portion of the apparatus, i. e., the still and the condenser, and one feature of the invention consists in accomplishing this automatically by the automatic valve L about to be described. Two diaphragms 14, 15, which may be made of thin metal, and are supported in shells 16, 17, are connected together by a rod 18 which has oppositely screw-threaded ends engaging nuts secured to the diaphragms so that the diaphragms can be drawn together under the proper tension. The shell 16 is connected by a pipe 19 with the lower pressure part of the apparatus, i. e., the brine reservoir and absorber. This connection may be conveniently made to the pipe 20 which carries the vapor from the brine into the absorber. The shell 17 is connected by pipe 21 with the higher pressure portion of the apparatus, i. e., the still and condenser. This connection may be conveniently made to the top of the pipe 12. A pivoted lever 22, carrying at one end an adjustable weight 23 and at its other end a valve 24, engages on the weight side of its pivot with a nut 25 carried by the rod 18 connecting the diaphragms and adjustable thereon. The valve 24 closes a minute opening in a soft rubber block 26, which is connected by a pipe 27 with the shell 17.

It will be seen that in this apparatus the diaphragms 14 and 15 are balanced against air pressure and are affected equally by, and are therefore independent of, changes in the barometric pressure. The pressure back of the diaphragm 14 is that of the lower pressure portion of the apparatus, which, being exceedingly low, may be regarded as zero pressure, while the pressure back of the diaphragm 15 is that of the higher pressure portion of the apparatus which is ordinarily equal to about two inches of mercury. The difference in pressures on the two diaphragms, when the apparatus is working normally, is sufficiently balanced by the adjustable weight 23 to enable the valve 24 to close the opening in the rubber block 26 air tight. Should, however, the pressure in the condenser and still fall below the normal pressure the weight 23 will overcome the upward thrust of the diaphragm 15 and will lift the valve 24 sufficiently to allow air to leak in minute quantities through the pipe 27 into the shell 17 and thence by the pipe 21 into the higher pressure portion of the apparatus. As soon as the normal conditions are established the pressure upon the diaphragm 15 will overcome the weight 23 and will close the air leak at the valve 24. The movement of the valve 24 to accomplish the opening and closing of the leak which it controls, is exceedingly slight, and consequently a very slight movement of the diaphragms, such as can be secured with metal diaphragms, is adequate.

Another feature of the invention consists in providing means whereby the height of the hydrostatic column, through which the water of condensation from the still is returned to the brine, may be varied to enable the apparatus to work most economically with circulation water of different temperatures. If the circulation water is warm it is necessary to maintain a greater air pressure in the pipe 12 and condenser I in order to secure the condensation of the water vapor, and this greater pressure necessitates the application of more heat at the still to vaporize the water from the potash solution. When the circulation water is colder, a less air pressure will secure condensation in the condenser and less heat is required at the still. The pressure maintained in the condenser and the still is dependent upon the height of the brine column through which the water is returned to the brine. Hence, to work the apparatus at the maximum economy it is necessary that the height of this brine column should be capable of being changed, as the temperature of the circulation water changes from season to season. To do this I provide the brine leg 13 with two or more taps 28, extending through the side wall of the refrigerator A and provided with means for closing their outer ends, such as the cocks 29 shown in the drawing. With one of these taps 28 is connected the flexible pipe 30, which may be a length of flexible pressure hose and which may be secured to the end of the tap 28 in any suitable way. The point at which this pipe 30 is connected with the brine leg determines the height of the hydrostatic column which maintains the air pressure in the condenser and still. The preferred arrangement of the parts is that illustrated in Fig. 2 in which the pipe 12 from the condenser enters the top of a float chamber 31, containing a float 32 which closes an opening in the bottom of the chamber 31 connected by a pipe 33 with the brine reservoir sufficiently below the surface of the brine to prevent the freezing of the water in the pipe 33. The water of condensation collects in the chamber 31 until the float 32 rises and opens the passage into the pipe 33, when the water flows into the brine reservoir under the control of the float 32. With the top of the chamber 31 is connected the flexible pipe 30, which in this case is an air pipe only, and the point at which the pipe 30 is connected with the brine leg 13 controls the pressure of the air in the pipe 30 and consequently the pressure in the condenser and still. When the pipe 30 is changed from a lower to a higher point of connection with the brine leg 13 the slack in the pipe 30 must be drawn upwardly, as indicated in dotted lines in Fig. 2.

To change the pipe 30 from one of the taps 28 to another without destroying the vacuum in the apparatus it is only necessary to put a pinch cock on the lower end of the pipe 30 and to close it by that means, when the cock in the tap with which the pipe 30 is connected can be closed, and the pipe 30 then removed from that tap and secured to another tap, after which the pinch cock will be removed and the valve of the latter tap opened.

A modification of the arrangement is illustrated in Fig. 3 in which the water of condensation is returned to the brine by means of a pipe 34 extending below the lower end of the brine leg 13 and upwardly into such brine leg, while the flexible air pipe 30 is connected to the pipe 12 at its junction with the pipe 34 and has a length sufficient to enable it to be connected with any one of the taps 28 from the brine leg 13; or, as shown in Fig. 4, the flexible pipe 30 can be used both to control the air pressure and to return the water of condensation to the brine reservoir.

What I claim is:

1. In a refrigerating machine of the class described, the combination with the still and condenser, of automatic means for supplying air to the still and condenser when the pressure falls below the normal, substantially as set forth.

2. In a refrigerating machine of the class described, the combination with the still and condenser, of an automatic valve controlled by the pressure in the still and condenser for supplying air to the still and condenser when the pressure falls below the normal, substantially as set forth.

3. In a refrigerating machine of the class described, the combination with the still and condenser, of an automatic valve controlled by the pressure in the still and condenser for supplying air to the still and condenser, and means for balancing said valve against barometric pressure, substantially as set forth.

4. In a refrigerating machine of the class described, the combination with the still and condenser, of an automatic valve controlled by the pressure in the still and condenser and balanced against the barometric pressure for supplying air to the still and condenser, substantially as set forth.

5. In a refrigerating machine of the class described, the combination with the still and condenser, of an automatic valve controlled by differences in pressure between the higher and lower pressure portions of the apparatus and operating to supply air to the higher pressure portion of the apparatus, substantially as set forth.

6. In a refrigerating machine of the class described, the combination with the still and condenser, of an automatic valve having two diaphragms connected together and each subject to the barometric pressure on one side and on the other side subject respectively to the pressure of the higher and lower pressure portions of the apparatus, and means operated by the movement of the diaphragms to open and close an air leak into the higher pressure portion of the apparatus, substantially as set forth.

7. In a refrigerating machine of the class described, the combination with the still, condenser and brine reservoir, of an air pressure connection between the still and condenser on the one hand and the brine reservoir on the other hand, and means for making this connection at different distances below the brine level in the reservoir, whereby the air pressure in the still and condenser may be adjusted to different temperatures of circulation water, substantially as set forth.

8. In a refrigerating machine of the class described, the combination with the still, condenser and brine reservoir, of a flexible pipe connection between the condenser and the brine reservoir, and means for making this connection at different distances below the brine level in the reservoir, substantially as set forth.

9. In a refrigerating machine of the class described, the combination with the still, condenser and brine reservoir, of means for returning the water of condensation from the condenser to the brine reservoir without disturbing the difference in pressure, an air pipe connecting the condenser and brine reservoir, and means for making the latter connection at different distances below the brine level in the reservoir, substantially as set forth.

10. In a refrigerating machine of the class described, the combination with the still, condenser and brine reservoir, of a connection from the condenser to the brine reservoir for returning the water of condensation to the brine, a float controlling the flow of the water into the brine so as not to disturb the difference in pressure, an air pipe connecting the condenser and brine reservoir, and means for making the latter connection at different distances below the brine level in the reservoir, substantially as set forth.

This specification signed and witnessed this second day of February, 1907.

RICHARD N. DYER.

Witnesses:
 JOHN S. LOTSCH,
 JNO. ROBT. TAYLOR.